3,304,318
METHOD FOR HYDROLYZING ALKOXYSILANES
Sam A. Brady, Midland, Mich., assignor to Dow Corning Corporation, Midland, Mich., a corporation of Michigan
No Drawing. Filed Aug. 27, 1962, Ser. No. 219,726
8 Claims. (Cl. 260—448.2)

This invention relates to a method for hydrolyzing alkoxysilanes. It is particularly concerned with a method for hydrolyzing and condensing alkoxysilanes to produce siloxanes of high molecular weight.

Acids, such as hydrochloric acid, have been used for a long time in the hydrolysis of various silanes. Although these acids have been generally satisfactory, they do possess certain disadvantages. For example, it would be desirable to develop a process for hydrolyzing and condensing alkoxysilanes to produce siloxanes of higher molecular weights than is possible with present processes.

It is an object of this invention to develop a new method for hydrolyzing alkoxysilanes. In particular, it is an object to develop a method for hydrolyzing and condensing alkoxysilanes in order to produce high molecular weight siloxanes. It is a further object of this invention to develop a new process for producing silanols.

These objects are obtained by a process which comprises hydrolyzing a silane of the formula $$R_nH_mSi(OR')_{4-n-m}$$

wherein R is selected from the group consisting of monovalent hydrocarbon and halogenated monovalent hydrocarbon radicals, R' is selected from the group consisting of alkyl radicals of from 1 to 6 inclusive carbon atoms and —$(CH_2)_nOR''$ radicals, wherein R'' is an alkyl radical from 1 to 3 inclusive carbon atoms, and $n$ has a value from 1 to 3 inclusive, $m$ has a value of from 0 to 1 inclusive, and the sum of $n+m$ is from 1 to 3 inclusive, by contacting said silane with sufficient water to completely hydrolyze the silane in the presence of a strongly-acidic cation exchange resin.

The operative silanes are of the formula $$R_nH_mSi(OR')_{4-n-m}$$

R can be a monovalent hydrocarbon or halogenated monovalent hydrocarbon radical. Suitable examples of such monovalent hydrocarbon radicals are alkyl radicals such as the methyl, ethyl, isopropyl, tert-butyl, 2-ethylhexyl, dodecyl, 1-isobutyl-3,5-dimethylhexyl, octadecyl and myricyl radicals; alkenyl radicals such as vinyl, allyl, decenyl and hexadienyl radicals; cycloalkyl radicals such as the cyclopentyl and cyclohexyl radicals; cycloalkenyl radical such as the cyclopentenyl, cyclohexenyl and cyclo-2,4-hexadienyl radicals; aryl radical such as the phenyl, naphthyl and xenyl radicals; aralkyl radical such as the benzyl, phenylethyl and xylyl radicals and alkaryl radical such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, α,α,α-trifluorotolyl, 2,4-dibromobenzyl, difluoromonochlorovinyl, and α,β,β-trifluoro-α-chlorocyclobutyl radicals, all of which are operative. Preferably R is a monovalent hydrocarbon radical. Phenyl and alkyl radicals such as methyl, ethyl, and isopropyl are the preferred monovalent hydrocarbon radicals.

R' is an alkyl radical of from 1 to 6 inclusive carbon atoms. Suitable examples of such alkyl radicals are methyl, ethyl, isopropyl, butyl and hexyl. R' can also be a —$(CH_2)_nOR''$ radical, wherein R'' is an alkyl radical of from 1 to 3 inclusive carbon atoms. Suitable examples of such radicals are —$CH_2OCH_3$, —$CH_2CH_2OCH_2CH_3$, —$CH_2CH_2OCH_2CH_2CH_3$, and —$CH_2CH_2CH_2OCH_3$. Since most of the R' radicals are removed during hydrolysis, it is preferred that the R' group contain as few carbon atoms as possible. Preferably R' is methyl. The subscript $n$ has a value of from 1 to 3 inclusive, $m$ has a value of from 0 to 1 inclusive and the sum of $n+m$ is from 1 to 3 inclusive.

The alkoxysilanes which are within the scope of this invention can be either simple compounds or mixtures. Individual alkoxysilanes which can be employed are those of the formulae $RSi(OR')_3$, $R_2Si(OR')_2$, $RHSi(OR')_2$ and $R_3Si(OR')$. Mixtures of any combination of these three types of alkoxysilanes can be employed. Also mixtures of any of the above types of alkoxysilanes or any combination thereof can be employed together with limited amounts of alkoxysilanes of the formula $Si(OR')_4$ and $HSi(OR')_3$. In all of the above cases, the average values of the ratios of the various substituents to silicon must fall within the above defined values.

Specific examples of alkoxysilanes which are within the scope of this invention are $(C_6H_5)Si(OCH_3)_3$, $(C_3H_7)HSi(OCH_2CH_3)_2$
$(CH_2{=}CHCH_2)(C_3H_7)Si(OCH_2CH_3)_2$
$(C_6H_{11})(CH_3)Si(OCH_3)_2$, $(CH_3CH_2)_3Si(OCH_2CH_3)$
$CH_3Si(OCH_2CH_2OCH_3)_3$ and
$(C_4H_9)_2Si[O(CH_2)_5CH_3]_2$.

It is essential that the above silane be contacted with water in the presence of a strongly-acidic cation exchange resin. A suitable example of such an exchange resin is the sulfonic acid cation exchange resin. Methods for preparing this resin are well known and this type of resin is commercially available. The strongly-acidic cation exchange resin is employed in catalytic quantities. The exact amount of exchange resin necessary is dependent upon the degree of hydrolysis desired and upon the type of exchange resin used.

The exact conditions required by this process are dependent primarily upon the type of product desired. By carefully controlling the conditions of this process, one can obtain either a higher molecular weight siloxane or a silanol.

In order to produce either silanols or siloxanes containing a minimal amount of residual —OR' group, it is necessary to use sufficient water to completely hydrolyze the silane. Generally, it is desirable to use an excess of water.

In order to obtain high molecular siloxanes, it is essential to use sufficient water to completely hydrolyze the silane and to condense the hydrolysis product obtained. It is often desirable to apply external heat to the reaction mass in order to aid the condensation of the hydroxyl radicals formed by hydrolysis of the silane. Various methods of condensing the hydrolysis product of alkoxysilanes are described in the art. The water and other volatiles can be removed from the reaction mass by any conventional means. Siloxane copolymers are obtained by hydrolyzing and condensing the desired mixture of alkoxysilanes. Higher molecular weight siloxanes are obtained when a strongly-acidic cation exchange resin is used than when other hydrolysis catalysts and techniques are used.

If it is desired to produce silanols, it is only necessary to modify the conditions of the process so that very little, if any, condensation takes place. Perhaps the best method for producing silanols is to conduct the hydrolysis at relatively low temperatures. This can be accomplished by either external cooling or by the slow addition of the alkoxysilane to water, or by both methods. Generally, temperatures below 5° C. are sufficient. Even when water in excess of the amount necessary to affect complete hydrolysis is used, the product is still likely to contain some —OR radicals.

The siloxanes obtained by the process of this invention are useful in places where siloxanes produced by other processes are useful. These siloxanes can be used to prepare resins, rubbers and fluids. The siloxanes of this invention are of higher molecular weight than siloxanes produced by other hydrolysis techniques. The silanols produced by this process are useful as intermediates to prepare siloxanes.

The strongly-acidic cation exchange resin is extremely useful as a hydrolysis catalyst because of the ease with which it can be controlled. The exchange resin can be readily removed by filtration, thus allowing the hydrolysis to be stopped at the desired stage. The strongly-acidic cation exchange resins are useful in the production of siloxanes because higher molecular weights are obtained with these resins than are obtained by conventional hydrolysis methods.

The following examples are only illustrative and should not be construed as limiting the invention which is properly delineated in the appended claims.

*Example 1*

In a two liter three-necked flask were placed 594 g. (3 mols) of phenyltrimethoxysilane and 50 g. of a sulfonic acid cation exchange resin (Dowex 50 WX 4). This mixture was agitated and 162 g. (9 mols) of water was then rapidly added. The temperature of the reaction mass increased rapidly to 58° C. External heat was applied so that the reaction mass was refluxed for 15 minutes. The cation exchange resin was removed by filtration and the volatiles removed under vacuum. The product was a phenylsiloxane resin. This phenylsiloxane resin contained 5.4 percent by weight hydroxyl radicals and 2.3 percent by weight methoxy radicals and had a solution viscosity of 730 cps. at 60 percent by weight solids in xylene. A phenylsiloxane produced from phenyltrimethoxysilane with 1 percent HCl had a hydroxyl content of 6.14 percent and a methoxy content of 3.26 percent and had a solution viscosity of 48 cps. at 60 percent by weight solids in xylene. This difference in solution viscosity is proof that much higher molecular weight siloxanes are obtained when sulfonic acid cation exchange resins are used than when HCl is used.

*Example 2*

Phenyltrimethoxysilane (396 g., 2 mols) was slowly added to 216 g. (12 mols) of water and 50 g. of sulfonic acid cation exchange resin (Dowex 50 WX 4) while stirring. External cooling was used to maintain the temperature below 3° C. during addition. The reaction mass was maintained at this temperature while stirring for one hour. The reaction mass was cooled to −20° C. and filtered. The precipitate was dissolved in acetone and filtered to remove the exchange resin. Analytical analysis identified the product as phenylsilanetriol.

*Example 3*

When any of the following silanes are substituted for the phenyltrimethoxysilane of Example 1, and the procedure of Example 1 is followed, siloxanes of the following unit formulae are obtained.

| Silane | Unit formula of Siloxane |
|---|---|
| $(C_3H_7)HSi(OCH_2CH_3)_2$ | $(C_3H_7)HSiO$. |
| $(CH_2=CHCH_2)(C_3H_7)Si(OCH_2CH_3)_2$ | $(CH_2=CHCH_2)(C_3H_7)SiO$. |
| $(C_6H_{11})(CH_3)Si(OCH_3)_2$ | $(C_6H_{11})(CH_3)SiO$. |
| $(CH_3CH_2)_3Si(OCH_2CH_3)$ | $(CH_3CH_2)_3SiO_{.5}$. |
| $CH_3Si(OCH_2CH_2OCH_3)_3$ | $CH_3SiO_{1.5}$. |
| $(CF_3CH_2CH_2)(CH_3)Si(OCH_3)_2$ | $(CF_3CH_2CH_2)(CH_3)SiO$. |
| Mixture of 50 mol percent $(CH_3)_2Si(OCH_3)_2$ and 50 mol percent $(C_6H_5)Si(OCH_3)_3$. | Copolymer of 50 mol percent $(CH_3)_2SiO$ and 50 mol percent $(C_6H_5)SiO_{1.5}$. |

*Example 4*

When any of the following silanes are substituted for the phenytrimethoxysilane of Example 2 and the procedure of Example 2 is followed, silanols of the following formulae are obtained.

| Silane | Silanol |
|---|---|
| $(C_3H_7)HSi(OCH_2CH_3)_2$ | $(C_3H_7)HSi(OH)_2$. |
| $(CH_2=CHCH_2)(C_3H_7)Si(OCH_2CH_3)_2$ | $(CH_2=CHCH_2)(C_3H_7)Si(OH)_2$. |
| $(C_6H_{11})(CH_3)Si(OCH_3)_2$ | $(C_6H_{11})(CH_3)Si(OH)_2$. |
| $(CH_3CH_2)_3Si(OCH_2CH_3)$ | $(CH_3CH_2)_3Si(OH)$. |
| $CH_3Si(OCH_2CH_2OCH_3)_3$ | $CH_3Si(OH)_3$. |
| $(CF_3CH_2CH_2)(CH_3)Si(OCH_3)_2$ | $(CF_3CH_2CH_2)(CH_3)Si(OH)_2$. |

That which is claimed is:

1. A process which comprises hydrolyzing and condensing a silane of the formula $R_nH_mSi(OR')_{4-n-m}$ to a siloxane of the unit formula $R_nH_mSiO_{(4-m-n)/2}$ wherein R is selected from the group consisting of monovalent hydrocarbon and halogenated monovalent hydrocarbon radicals, R' is selected from the group consisting of alkyl radicals of from 1 to 6 inclusive carbon atoms and —$(CH_2)_nOR''$ radicals, wherein R'' is an alkyl radical from 1 to 3 inclusive carbon atoms, and $n$ has a value from 1 to 3 inclusive, $m$ has a value of from 0 to 1 inclusive, and the sum of $n+m$ is from 1 to 3 inclusive, by contacting said silane with sufficient water to completely hydrolyze the silane in the presence of a sulfonic acid cation exchange resin.

2. The process of claim 1 wherein R is a monovalent hydrocarbon radical, and R' is an alkyl radical of from 1 to 6 inclusive carbon atoms.

3. The process of claim 2, wherein R' is methyl.

4. A process for preparing a siloxane of the unit formula $R_nH_mSiO_{(4-n-m)/2}$ which comprises contacting a silane of the formula $R_nH_mSi(OR')_{4-n-m}$ in the presence of a sulfonic acid cation exchange resin with sufficient water to completely hydrolyze the silane and then condensing the hydrolysis product obtained, wherein R is selected from the group consisting of monovalent hydrocarbon and halogenated monovalent hydrocarbon radicals, R' is selected from the group consisting of alkyl radicals from 1 to 6 inclusive carbon atoms and —$(CH_2)_nOR''$ radicals, wherein R'' is an alkyl radical from 1 to 3 inclusive carbon atoms, $n$ has a value from 1 to 3 inclusive, $m$ has a value of from 0 to 1 inclusive, and the sum of $m+n$ is from 1 to 3 inclusive.

5. The process of claim 4 wherein R is a monovalent hydrocarbon radical, and R' is an alkyl radical from 1 to 6 inclusive carbon atoms.

6. The process of claim 5 wherein the R' is methyl.

7. The process of claim 1 where $n$ is 1 and $m$ is 0.

8. The process of claim 1 where the silane which is hydrolyzed and condensed is phenyltrimethoxysilane.

References Cited by the Examiner

UNITED STATES PATENTS

| 2,460,805 | 2/1949 | Britton et al. | 260—448.2 |
| 2,486,162 | 10/1949 | Hyde | 260—448.2 |
| 2,717,900 | 9/1955 | Plueddemann et al. | 260—448.2 |
| 2,719,859 | 10/1955 | Nitzsche et al. | 260—448.2 |
| 2,831,008 | 4/1958 | Knopf et al. | 260—448.2 |

FOREIGN PATENTS 882,091  7/1953  Germany.

OTHER REFERENCES

Haskell et al.: "Jour. American Chem. Soc.," vol. 71 (1949), pp. 1284–8.

HELEN M. McCARTHY, *Primary Examiner.*

SAMUEL H. BLECH, *Examiner.*

J. G. LEVITT, *Assistant Examiner.*